Nov. 9, 1971     E. R. SAUDER     3,618,475
LOAD CONTROLLING DEVICE FOR COMPRESSORS
Filed June 1, 1970     2 Sheets-Sheet 1

FIG-1-

INVENTOR:
EARL R. SAUDER.
BY Owen + Owen
ATT'YS.

United States Patent Office 3,618,475
Patented Nov. 9, 1971

3,618,475
LOAD CONTROLLING DEVICE FOR COMPRESSORS
Earl R. Sauder, Mount Vernon, Ohio, assignor to Cooper Industries, Inc., Houston, Tex.
Filed June 1, 1970, Ser. No. 41,881
Int. Cl. F01b 31/14
U.S. Cl. 92—60.5                                    5 Claims

ABSTRACT OF THE DISCLOSURE

The invention is a fluid compressor load controlling device having an expandable piston within a cylinder. A collapsable bellows in communication with a pressurized fluid source varies in volume with the amount of fluid present in the bellows. This correspondingly varies the size of said piston and inversely the volume of said cylinder thereby varying the compression load on the fluid compressor.

BACKGROUND OF THE INVENTION

Devices for controlling fluid compressor loads are numerous in the art. Many of these devices comprise mechanisms which maintain the compressor valve inlet in an open position during all or part of the compression stroke to control the capacity of the compressor. Other methods include the so-called "saw tooth method" wherein the compressor ends are "knocked out" to control capacity.

One inherent difficulty in prior art load controlling devices lies in compressor horsepower losses caused by the back-flowing of fluids through the open suction valves and connected piping during the controlling or "unloading" portion of the compressor stroke. Furthermore many existing load controlling devices cause imbalances in the compressor which necessitate the over-design of moving elements to compensate for the stresses resulting from the load imbalance.

It is the object of this invention to reduce horsepower losses and over design problems present in prior art compressor load controlling devices, through the implementation of a combination including an expandable compressor piston which may be variably reduced or increased to a predetermined size and thereby inversely reduce or increase the volume of the corresponding compressor cylinder.

A further object is to provide a load controlling device with a precise yet infinitely variable load capacity between the maximum and minimum extreme capacities of the fluid compressor.

Still a further object of the invention is to provide a compressor load controlling device which provides for complete unloading during the starting operation of the compressor thus permitting the attainment of full speed in the compressor driver before a load is placed upon the compressor.

Other objects and advantages of the invention will be apparent from the following description and accompanying drawings in which.

Figure 1:
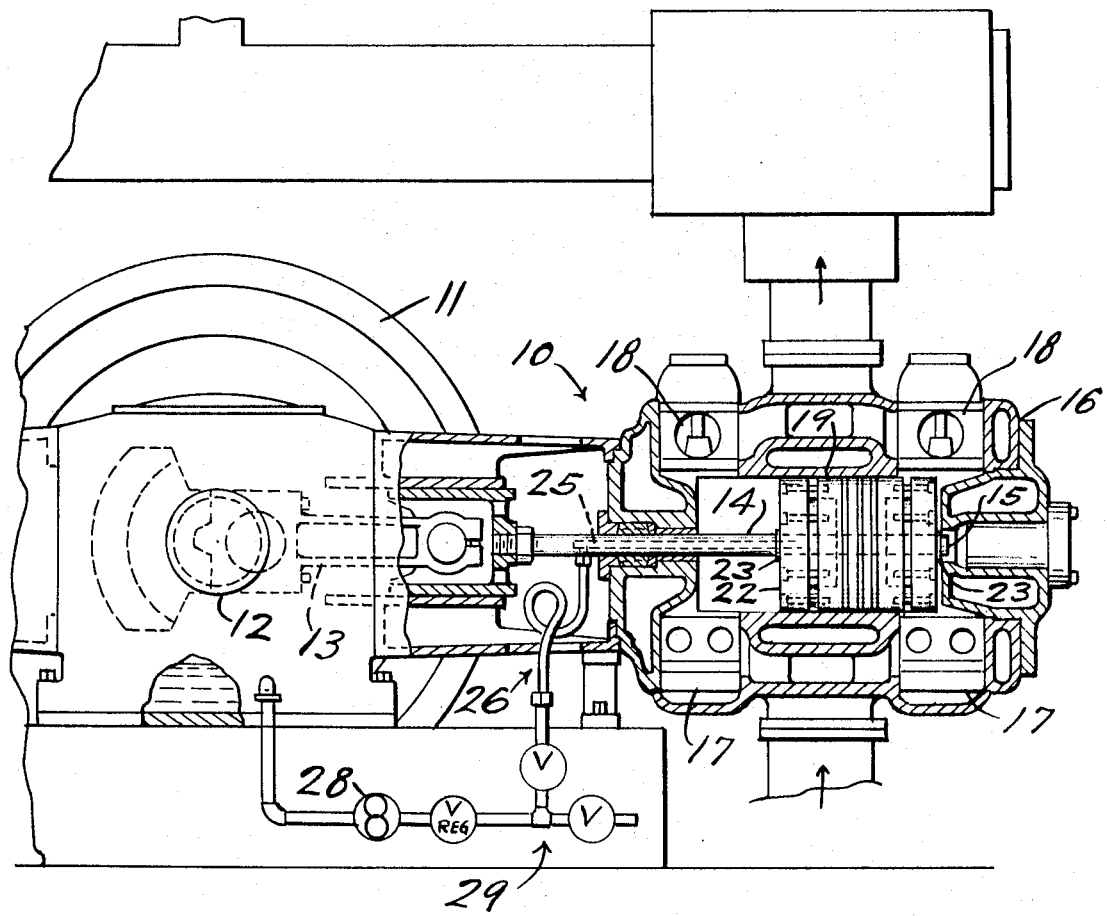
FIG. 1 is a partially diagrammatic sectional view of a fluid compressor embodying the invention.

Referring to FIG. 1, a fluid compressor is generally indicated by the reference number 10. The compressor includes a prime mover 11; a crankshaft 12 operatively connected to said prime mover 11; and a connecting rod 13 operatively connected between said crankshaft 12 and a piston rod 14. The piston rod 14 is operatively connected to an expandable piston 15. The expandable piston 15 moves axially within a compressor cylinder 16, the outside diameter of said piston 15 being substantially contiguous with the inside diameter of said cylinder 16. The cylinder 16 has intake valves 17 and exhaust valves 18.

Figure 2:
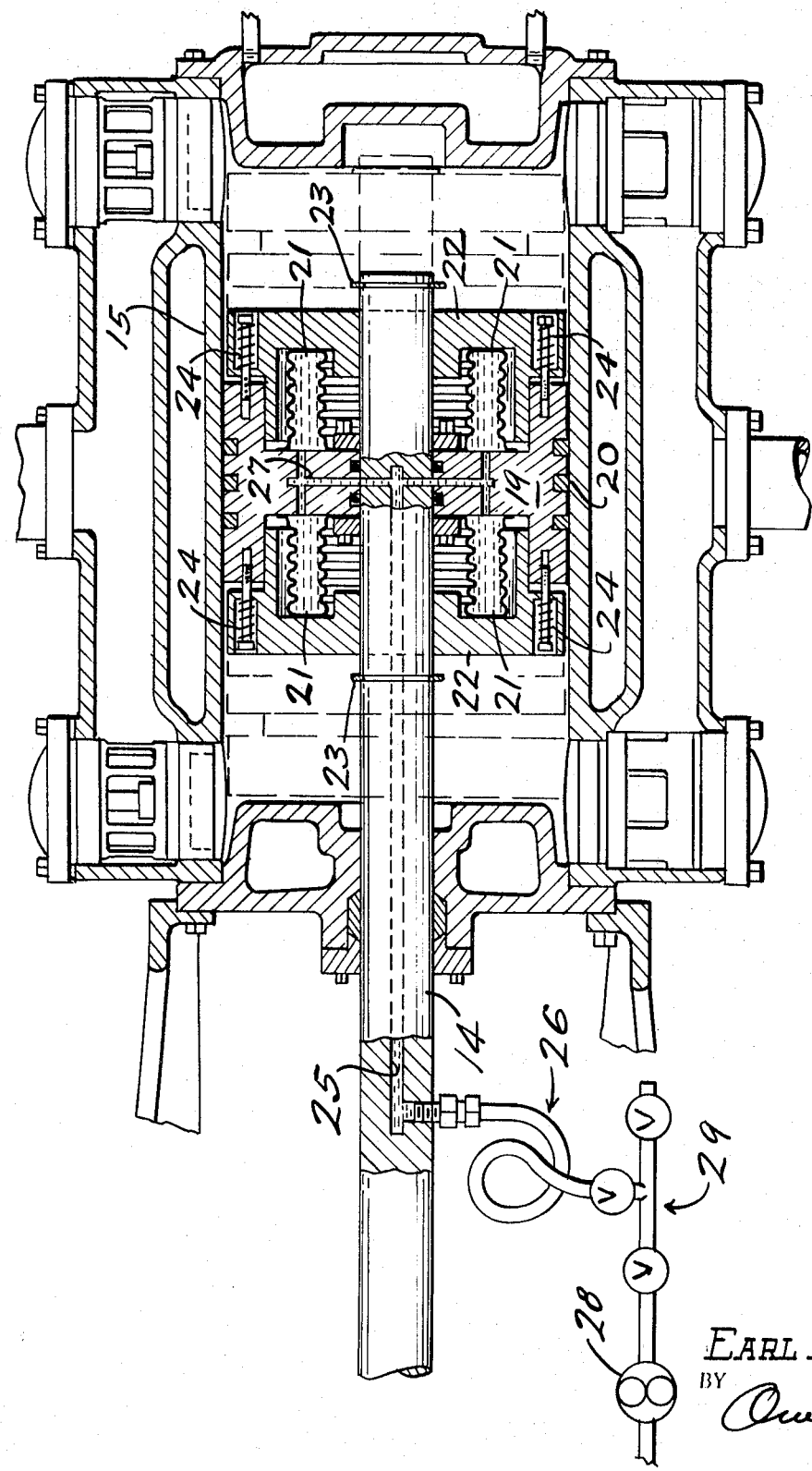
FIG. 2 is a partially diagrammatic sectional view showing a fluid cylinder, piston rod and piston according to the invention.

Referring to FIG. 2, the expandable piston 15 has a piston body 19 attached to the piston rod 14 and carrying on its periphery piston rings 20. At least one set of collapsible bellows 21 is positioned in contact between said piston body 19 and a piston head 22. The piston head 22 is slideably attached to the piston rod 14. Retaining rings 23 are connected to the piston rod 14 ahead of the piston heads 22 and define the outermost limits of travel of said piston heads 22 away from the piston body 19. Tension springs 24 are connected between the piston body 19 and the piston head 22 to maintain said piston body 19 in contact with the collapsible bellows 21 and to aid the return of the bellows 21 to a collapsed condition when fluid is evacuated from the bellows 21.

The piston rod 14 includes a center bore 25 which extends axially from a flexible coupling 26 to the piston body 19. The bore 25 is in communication with a piston body channel 27 which supplies fluid to the collapsable bellows 21.

A variable pressure pump 28, upon actuation, forces liquid from a supply source (not shown) through the flexible coupling 26, into the bore 25, into the piston body channel 27 and into the collapsible bellows 21 thereby facilitating the expansion of the bellows 21 to a predetermined volume. As the volume of the bellows 21 is increased, the piston heads 22 slide along the piston rod 14 toward the respective retaining rings 23. As the piston 15 is expanded the volume of the cylinder 16 is inversely reduced placing a higher compression load on the prime mover 11.

Fluid is released from the collapsible bellows 21 through actuation of valve means 29. The volume of the bellows 21 is reduced and the piston heads 22 correspondingly slide toward the piston body 19. As the piston 15 is retracted the volume of the cylinder is inversely increased thereby reducing the compression load on the prime mover. Thus by expanding or contracting the piston 15 to any predetermined point within the limits of travel of the piston heads 22, the load on the compressor may be varied from a zero-load position to a maximum-load position.

I claim:
1. A load controlling device for compressors comprising a cylinder, a reciprocating piston rod movable axially of said cylinder, a piston operatively connected to said piston rod and movable within said cylinder, the outer diameter of said piston being substantially contiguous with the inside diameter of said cylinder, said piston comprising a body, at least one piston head mounted on said body, bellows means operatively connected to said body and said piston head, fluid supply means in communication with said bellows means, and means for forcing fluid from said fluid supply under pressure into said bellows means for expanding said bellows means to a predetermined volume whereby the position of said piston head is maintained in variable relationship with said piston body and whereby the effective volume of said cylinder may be varied.

2. A load controlling device for compressors according to claim 1 wherein said piston rod defines a longitudinally extending bore and wherein said fluid supply means comprises a variable pressure pump having its outlet in fluid communication with such bore, said piston body including a piston body channel which opens into said collapsable bellows means, such channel being in fluid communication with such bore and said bellows means.

3. A load controlling device for compressors according to claim 1 including retaining means for limiting the movement of said piston head away from said piston body.

4. A load controlling device for compressors according to claim 1 including tension biasing means for urging said piston head toward said piston body.

5. A load controlling device for compressors according to claim 3 wherein said retaining means comprise retaining rings attached to the piston rod, said retaining rings being located forward of the piston head, wherein the retaining rings define the maximum extent of movement by said piston head away from said piston body when said bellows means are expanded.

References Cited
UNITED STATES PATENTS 2,961,015 11/1960 Randall _____ 92—65X
3,063,423 11/1962 Riordan _____ 92—65

CARLTON R. CROYLE, Primary Examiner
R. J. SHER, Assistant Examiner

U.S. Cl. X.R.
417—274